United States Patent
Bailly et al.

(10) Patent No.: US 6,608,163 B2
(45) Date of Patent: Aug. 19, 2003

(54) POLYCARBONATE COPOLYMERS HAVING IMPROVED HYDROLYTIC STABILITY

(75) Inventors: Christian Maria Emile Bailly, Antwerp (BE); Tiberiu Mircea Siclovan, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 327 days.

(21) Appl. No.: 09/764,795

(22) Filed: Jan. 17, 2001

(65) Prior Publication Data

US 2002/0137873 A1 Sep. 26, 2002

(51) Int. Cl.$^7$ .............................................. C08G 64/00
(52) U.S. Cl. ...................................... 528/196; 528/198
(58) Field of Search .................................. 528/196, 198

(56) References Cited

U.S. PATENT DOCUMENTS

| | | | | |
|---|---|---|---|---|
| 4,948,871 A | * | 8/1990 | Fukuoka | 528/481 |
| 5,145,939 A | * | 9/1992 | Nye | 528/125 |
| 5,204,377 A | * | 4/1993 | Fukawa | 528/481 |
| 5,214,073 A | * | 5/1993 | Fukawa | 521/60 |
| 5,237,040 A | * | 8/1993 | Berti et al. | 528/196 |
| 5,276,129 A | * | 1/1994 | Sakashita et al. | 528/171 |
| 5,336,743 A | * | 8/1994 | Takaoka et al. | 526/292.4 |
| 5,767,225 A | * | 6/1998 | Brunelle et al. | 528/190 |
| 6,031,062 A | * | 2/2000 | Day et al. | 528/196 |

FOREIGN PATENT DOCUMENTS

| | | |
|---|---|---|
| DE | 2940190 | 4/1981 |
| EP | 379055 A2 | 1/1990 |
| EP | 397317 B1 | 4/1990 |
| EP | 397317 A1 | 4/1990 |
| JP | 9254540 | 9/1997 |
| WO | 9919380 | 9/1998 |

OTHER PUBLICATIONS

"Self–regulating Polycondensations: ordered aromatic polyamide–esters"; Preston, Jack. Chemistrand Res. Cent., Inc., Durham, N.C., USA, J. Polym. Sci., Part A–1 (1970), 8(11), 3135–44.

"Thermal Stabilization of Polyamides by Phenol Inhibitors"; Pleshakov, M.G.; Smirnova, G.P.; Merkureva, E.V.; Khim, Volokna (1967), (1), 26–8.

Structure–properties Relationship for Liquid–crystalline Copoly(ester amides); Sekk, Danuta; Wolinska, Aleksandra; Inst. Polym. Chem., Pol. Acad. Sci.; Zabrze, Pol.; Eur. Polym. J. (1989), 25(1), 9–14.

"Synthesis of poly(enaryloxynitriles) containing arylate and aramide units in the Main Chain and Their Thermal Properties"; Kim, Byung–gu; Lee, Seung–Jae; Gong, Myoung–Seon; Department of Chemistry; Dankook University; Chungnam, S. Korea, Korea Polym. J. (1995) vol. Date 1995, 3(1), 41–7.

"Synthesis and Thermal Behavior of New High–Temperature Silicon–Containing Bismaleimides"; Mikroyannidis, John A.; Melissaris, Anastasios P.; Dep. Chem., Univ. Patras; Patras, Greece; Br. Polym. J. (1990); 23(4); 309–14.

Structure–liquid Crystalline Properties Relationship of Poly-(esteramides); Sek. Danuta; Wolinska, Aleksandra; Janeczek, Henryk; Inst. Polym. Chem., Pol. Acad. Sci.; Zabrze, Pol.: J. Polym. Mater. (1986, 3(4), 225–33, 1 plate.

Database WPI, Section Ch. Week 198709, Derwent Pub. Ltd. Class A23, AN 1987–060615, XP–002193232 & JP 62 015322 A (Idemitsu Kosan Co. Ltd), Jan. 23, 1987 (Jan. 23, 1987) Abstract.

* cited by examiner

*Primary Examiner*—Terressa M. Boykin
(74) *Attorney, Agent, or Firm*—Bernadette M. Bennett; Noreen C. Johnson

(57) ABSTRACT

The present invention provides polycarbonate copolymers having improved hydrolytic stability, solvent resistance, or combinations thereof. In particular, certain of the copolymers of the invention have improved resistance to dilute caustic solution. Thus, the copolymers of the present invention are particularly useful as structural elements in applications where such elements routinely come in contact with caustic solutions, such as in automatic dishwashing equipment. Preferred comonomers include 4,4'-biphenol, bis-(4-hydroxyphenyl)terephthalamide ("BHPT"), and a bisimide bisphenol obtained by reacting Bisphenol A dianhydride (BPADA) with 4,4'-isopropylidene phenol aniline. The comonomers are utilized along with 2,2-bis(4-hydroxyphenyl)propane (Bisphenol A) in concentrations in a range between about 1 and about 50 weight percent of the repeating units in the polycarbonate.

33 Claims, No Drawings

POLYCARBONATE COPOLYMERS HAVING IMPROVED HYDROLYTIC STABILITY

BACKGROUND OF THE INVENTION

This invention belongs to the field of polycarbonates. In particular, it relates to polycarbonate copolymers having improved solvent resistance, improved hydrolytic stability, or combinations thereof.

Polycarbonates in general are prepared from dihydric phenol compounds and carbonic acid derivatives. For example, one important polycarbonate can be prepared via melt polymerization of diphenyl carbonate and Bisphenol A. The reaction is conducted at high enough temperatures for the starting monomers and product to remain molten, while the reactor pressure is staged in order to effectively remove phenol, the by-product of the polycondensation reaction.

Condensation polymers such as the polycarbonates are susceptible to hydrolytic degradation, especially under certain environmental exposures. In particular, when polycarbonate is utilized as an internal structural component in dishwashers, the polycarbonate material is regularly exposed to dilute caustic solution, which has deleterious effects on the polymer structure over time. Further, many polycarbonates are utilized in applications which involve exposure to organic solvents.

Thus, a need exists for polycarbonates having improved hydrolytic stability, especially against dilute caustic solution as well as resistance to organic solvents.

SUMMARY OF THE INVENTION

The present invention provides polycarbonate copolymers having improved hydrolytic stability, solvent resistance, or combinations thereof. In particular, certain of the copolymers of the invention have improved resistance to dilute caustic solution, while others show improved solvent resistance. Thus, the copolymers of the present invention are particularly useful as structural elements in applications where such elements routinely come in contact with caustic solutions, such as in automatic dishwashing equipment. Preferred comonomers include 4,4'-biphenol, bis-(4-dihydroxyphenyl)terephthalamide ("BHPT"), and a bisimide bisphenol obtained by reacting Bisphenol A dianhydride (BPADA) with 4,4'-isopropylidene phenol aniline. The comonomers are utilized along with 2,2-bis(4-hydroxyphenyl)propane (Bisphenol A) in concentrations in a range between about 1 weight percent and about 50 weight percent of repeating units in the polycarbonate based on total dihydric phenol.

DETAILED DESCRIPTION OF THE INVENTION

In this application:

The singular forms "a," "an" and "the" include plural referents unless the context clearly dictates otherwise.

"Optional" or "optionally" means that the subsequently described event or circumstances may or may not occur, and that description includes instances where the event or circumstance occurs and instances where it does not.

"BPA" is herein defined as Bisphenol A or 2,2-bis(4-hydroxyphenyl)propane.

Unless otherwise stated, "weight percent" in reference to the composition of a polycarbonate in this specification is based upon 100 weight percent of the repeating units of the polycarbonate. For instance, "a polycarbonate comprising 90 weight percent of BPA" refers to a polycarbonate in which 90 weight percent of the repeating units are residues derived from Bisphenol A or its corresponding derivative(s). Corresponding derivatives include, but are not limited to, corresponding oligomers of the diphenols; corresponding esters of the diphenol and their oligomers; and the corresponding chloroformates of the diphenol and their oligomers.

Thus, in one aspect, the present invention provides a polycarbonate comprised of residues of;

(a) a diester compound; and
(b) a dihydric phenol compound, wherein said dihydric phenol compound(s) are comprised of
 (i) 2,2-bis(4-hydroxyphenyl) propane;
 (ii) at least one comonomer in a range between about 1 weight percent and about 50 weight percent of the repeating units in the polycarbonate, comprising bis-(4-hydroxyphenyl)-terephthalamide, bis-(3-hydroxyphenyl)terephthalamide, a compound of the formula

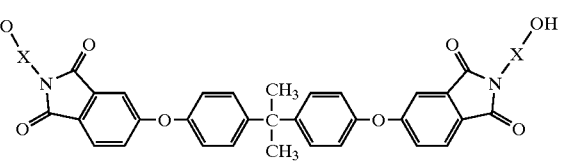

wherein X is a divalent aromatic moiety; and
 (iii) optionally, dihydric phenol compounds in addition to those in (i) and (ii).

The polycarbonate is formed via a polycondensation reaction.

Examples of divalent groups (X) include phenylene, naphthalene, and groups of the formula

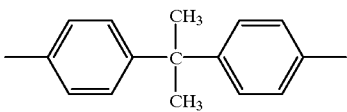

(i.e., "Bisimide BPA" or BIABPA) as well as such groups optionally substituted by one or more groups selected from $C_1-C_8$ alkyl, $C_1-C_8$ alkoxy, halo, nitro, and the like.

The utilization of the above monomers provides, in certain cases, improved hydrolytic stability to the polycarbonate compositions and in certain cases improved solvent resistance. In an alternate embodiment of the present invention, the monomers in paragraph (ii) above are utilized in proportions in a range between about 1 weight percent and about 40 weight percent of the repeating units in the polycarbonate with no greater than 15 weight percent of any one given comonomer. In a further alternate embodiment of the present invention, the monomers in paragraph (ii) above are utilized in a range between about 1 weight percent and about 5 weight percent of the repeating units in the polycarbonate. In this regard, the use of the term "residue" denotes that portion of the molecule or moiety which remains after the polycondensation reaction has taken place.

The structure of bis-(4-hydroxyphenyl)terephthalamide and bis-(3-hydroxyphenyl)terephthalamide (BHFF) are as follows, respectively:

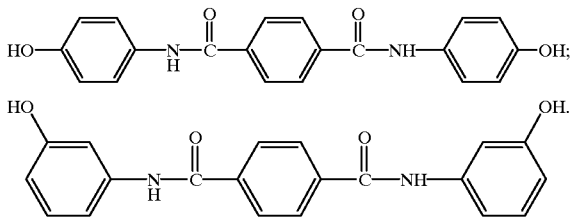

Certain combinations of comonomers result in melt phase-produced polycarbonates having improved hydrolytic stability. In particular, when the comonomers illustrated above in this first aspect of the present invention are utilized with 4,4'-biphenol, hexafluoro Bisphenol A, or combinations thereof, the resulting polycarbonates exhibit improved hydrolytic stability. Thus, in a typical embodiment of this first aspect of the present invention, there is provided the polycarbonates of the first aspect, further comprising at least one comonomer selected from 4,4'-biphenol and a compound of the formula

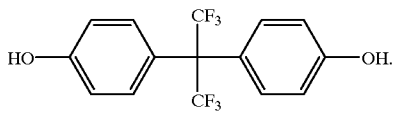

In a typical embodiment of the present invention, the 4,4'-biphenol, hexafluoro Bisphenol A, or combinations thereof, are utilized in an amount in a range between about 1 weight percent and about 15 weight percent of the repeating units in the polycarbonate.

4,4'-Biphenol alone as a comonomer in conjunction with Bisphenol A in a melt phase-produced polycarbonate is useful in effecting an increase in hydrolytic stability. Thus, in a second aspect of the present invention, there is provided a polycarbonate comprised of residues of;

(a) a diester compound; and
(b) a dihydric phenol compound, wherein said dihydric phenol compound(s) are comprised of
  (i) 2,2-bis(4-hydroxyphenyl) propane; and
  (ii) 4,4'-biphenol in a range between about 1 weight percent and about 30 weight percent of the repeating units in the polycarbonate.

In this regard, 4,4'-biphenol is commonly in an amount in a range between about 1 weight percent and about 15 weight percent of the repeating units in the polycarbonate.

4,4'-Biphenol, when utilized with certain other comonomers, results in improved hydrolytic stability in melt phase-produced polycarbonates. Thus, in third aspect, the present invention provides a polycarbonate comprised of residues of:

(a) a diester compound; and
(b) a dihydric phenol compound, wherein said dihydric phenol compound(s) are comprised of
  (i) 2,2-bis(4-hydroxyphenyl) propane; and
  (ii) comonomers in a range between about 1 weight percent and about 50 weight percent of the repeating units in the polycarbonate, comprising 4,4'-biphenol and a compound of the formula

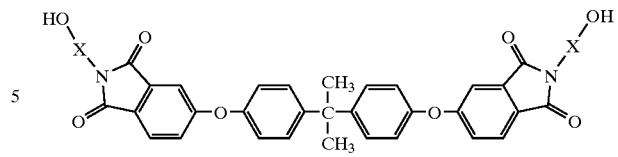

wherein X is a group of the formula

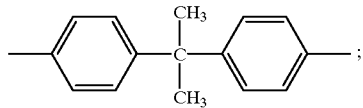

wherein the proportion of 4,4'-biphenol is in a range between about 1 weight percent and about 15 weight percent of the repeating units in the polycarbonate.

BIABPA, when utilized as a comonomer in a melt phase-produced polycarbonate, provides improved hydrolytic stability. Thus, in a fourth aspect of the present invention, there is provided a polycarbonate comprised of residues of;

(a) a diester compound; and
(b) a dihydric phenol compound, wherein said dihydric phenol compound(s) are comprised of
  (i) 2,2-bis(4-hydroxyphenyl) propane; and
  (ii) a comonomer in a range between about 1 weight percent and about 50 weight percent of the repeating units in the polycarbonate, of the formula

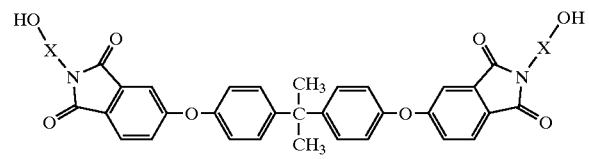

wherein X is a group of the formula

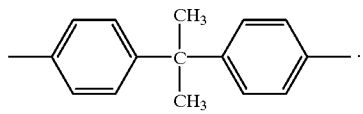

In this fourth aspect of the present invention, it is especially typical that the BIABPA is utilized in a range between about 1 weight percent and about 15 weight percent of the repeating units in the polycarbonate.

Bis-(4-hydroxyphenyl)terephthalamide in a melt phase-produced polycarbonate yields polycarbonates having improved solvent resistance. Thus, in a yet a fifth aspect of the present invention, there is provided a polycarbonate comprised of residues of;

(a) a diester compound; and
(b) a dihydric phenol compound, wherein said dihydric phenol compound(s) are comprised of
  (i) 2,2-bis(4-hydroxyphenyl) propane; and
  (ii) bis-(4-hydroxyphenyl)terephthalamide in a range between about 1 weight percent and about 50 weight percent of the repeating units in the polycarbonate.

In this fifth aspect of the present invention, it is especially typical that the bis-(4-hydroxyphenyl)terephthalamide is utilized in an amount in a range between about 1 weight percent and about 20 weight percent, most preferably in a range between about 1 weight percent and about 15 weight percent of the repeating units in the polycarbonate. Alternatively, the meta isomer, i.e., bis-(3-hydroxyphenyl) terephthalamide can be utilized as a whole or partial replacement for the bis-(4-hydroxyphenyl)terephthalamide.

In each of these five aspects, the polycarbonate is typically comprised of BPA residues and residues of the comonomers as set forth herein. Accordingly, it is that Bisphenol A is utilized in an amount in a range between about 50 weight percent and about 99 weight percent of the repeating units in the polycarbonate.

Optionally, the polycarbonate may be further comprised of other dihydric phenol compound residues in an amount up to about 20 weight percent of the repeating units in the polycarbonate, thereby replacing the Bisphenol A, the comonomers, or combinations thereof, of the present invention in the total amount of dihydric phenol compounds utilized. Examples of such compounds include the following:
resorcinol
4-bromoresorcinol
hydroquinone
4,4'-dihydroxybiphenyl ether
4,4-thiodiphenol
1,6-dihydroxynaphthalene
2,6-dihydroxynaphthalene
bis(4-hydroxyphenyl)methane
bis(4-hydroxyphenyl)diphenylmethane
bis(4-hydroxyphenyl)-1-naphthylmethane
1,1-bis(4-hydroxyphenyl)ethane
1,1-bis(4-hydroxyphenyl)propane
1,2-bis(4-hydroxyphenyl)ethane
1,1-bis(4-hydroxyphenyl)-1-phenylethane
1,1-bis(3-methyl-4-hydroxyphenyl)-1-phenylethane
2-(4-hydroxyphenyl)-2-)3-hydroxypbenyl)propane
2,2-bis(4-hydroxyphenyl)butane
1,1-bis(4-hydroxyphenyl)isobutane
1,1-bis(4-hydroxyphenyl)decane
1,1-bis(3,5-dimethyl-4-hydroxyphenyl)cyclohexane
1,1-bis(3,5-dibromo4-hydroxyphenyl)cyclohexane
1,1-bis(4-hydroxyphenyl)cyclohexane
1,1-bis(4-hydroxyphenyl)cyclododecane
1,1-bis(3,5-dimethyl-4-hydroxyphenyl)cyclododecane
trans-2,3-bis(4-hydroxyphenyl)-2-butene
4,4-dihydroxy-3,3-dichlorodiphenyl ether
4,4-dihydroxy-2,5-dihydroxy diphenyl ether
2,2-bis(4-hydroxyphenyl)adamantine
α, α'-bis(4-hydroxyphenyl)toluene
bis(4-hydroxyphenyl)acetonitrile
2,2-bis(3-methyl-4-hydroxyphenyl)propane
2,2-bis(3-ethyl4-hydroxyphenyl)propane
2,2-bis(3-n-propyl4-hydroxyphenyl)propane
2,2-bis(3-isopropyl-4-hydroxyphenyl)propane
2,2-bis(3-sec-butyl-4-hydroxyphenyl)propane
2,2-bis(3-t-butyl-4-hydroxyphenyl)propane
2,2-bis(3-cyclohexyl-4-hydroxyphenyl)propane
2,2-bis(3-aryl-4-hydroxyphenyl)propane
2,2-bis(3-methoxy-4-hydroxyphenyl)propane
2,2-bis(3,5-dimethyl-4-hydroxyphenyl)propane
2,2-bis(2,3,5,6-tetramethyl 4-hydroxyphenyl)propane
2,2-bis(3-5-dichloro-4-hydroxyphenyl)propane
2,2-bis(3 ,5-dibromo-4-hydroxyphenyl)propane
2,2-bis(2,6-dibromo-3,5-dimethyl-4-hydroxyphenyl) propane
α, α-bis(4-hydroxyphenyl)toluene
α, α, α', α'-Tetramethyl-α, α'-bis(4-hydroxyphenyl)-p-xylene
1,1-dichloro-2,2-bis(4-hydroxyphenyl)ethylene
1,1-dibromo-2,2-bis(4-hydroxyphenyl)ethylene
1,1-dichloro-2,2-bis(5-phenoxy-4-hydroxyphenyl)ethylene
4,4'-di hydroxybenzophenone
3,3-bis(4-hydroxyphenyl)-2-butanone
1,6-bis(4-hydroxyphenyl)-1,6-hexanediol
ethylene glycol bis(4-hydroxyphenyl)ether
bis(4-hydroxyphenyl)ether
bis-(4-hydroxyphenyl)sulfide
bis(4-hydroxyphenyl)sulfoxide
bis(4-hydroxyphenyl)sulfone
bis(3,5-dimethyl-4-hydroxypbenyl)sulfone
9,9-bis(4-hydroxyphenyl)fluorene
2,7-dihydroxypyrene
6,6'-dihydroxy-3,3,3',3'-tetramethylspiro(bis)indane ("spirobiindane Bisphenol")
3,3-bis(4-hydroxyphenyl)phthalimide
2,6-dihydroxybenzene-p-dioxin
2,6-dihydroxythianthrene
2,7-dihydroxyphenoxathiin
2,7-dihydroxy-9,10-dimethylphenazine
3,6-dihydroxydibenzofuran
3,6-dihydroxydibenzothiophene
2,7-dihydroxycarbazole.

A further example of suitable dihydric phenols include those containing spirobiindane structural units such as those represented by the formula:

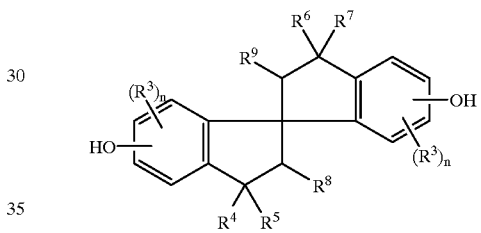

wherein each $R^3$ is independently selected from monovalent hydrocarbon radicals and halogen radicals; each $R^4$, $R^5$, $R^6$, and $R^7$ is independently $C_1$–$C_6$ alkyl; each $R^8$ and $R^9$ is independently H or $C_1$–$C_6$ alkyl; and each n is independently selected from positive integers having a value in a range between 0 and about 3, inclusive. The monovalent hydrocarbon radicals represented by $R^3$ are preferably those containing in a range between about 1 carbon atom and about 12 carbon atoms, and include branched alkyl radicals and straight chain alkyl radicals. Some illustrative, non-limiting examples of these alkyl radicals include methyl, ethyl, propyl, isopropyl, butyl, tertiary-butyl, pentyl, neopentyl, and hexyl. Cycloalkyl radicals represented by $R^3$ are preferably those containing in a range between about 3 ring carbon atoms and about 12 ring carbon atoms. Some illustrative non-limiting examples of these cycloalkyl radicals include cyclobutyl, cyclopentyl, cyclohexyl, methylcyclohexyl, and cycloheptyl. Aryl radicals represented by $R^3$ are preferably those containing in a range between about 6 ring carbon atoms and about 12 ring carbon atoms. Some illustrative non-limiting examples of these aryl radicals include phenyl, biphenyl, and napbthyl. Preferred aralkyl and alkaryl radicals represented by $R^3$ are those containing in a range between about 7 carbon atoms and about 14 carbon atoms. These include, but are not limited to, benzyl, ethylphenyl, phenylbutyl, phenylpropyl, propylphenyl, and phenylethyl. The preferred halogen radicals represented by R $^3$are fluorine, chlorine and bromine.

In the dihydric phenols of the above formula, when more than one $R^3$ substituent is present, they may be the same or different. The relative positions of the hydroxyl groups and $R^3$ on the aromatic nuclear residues may be varied in the ortho or meta positions. The position of each hydroxy group is independently at any unsubstituted site on each of the aromatic rings.

The spirobiindane dihydric phenols of the above formula are compounds that are known in the art and are commercially available or may be readily prepared by known methods. Methods of preparation include those described in U.S. Pat. No. 4,701,566; and by R. F. Curtis and K. O. Lewis in Journal of the Chemical Society (England), 1962, p. 420; and by R. F. Curtis in Journal of the Chemical Society (England), 1962, p. 417. In one illustrative, non-limiting example, these spiro dihydric phenols may be conveniently prepared by (i) reacting two moles of a phenolic compound with one mole of a carbonyl-containing compound such as acetone, and (ii) thereafter co-reacting 3 moles of the product of (i) under acidic conditions to form the spiro dihydric phenol and 4 moles of a phenolic compound. The acids which may be utilized in (ii) can include acids as anhydrous methanesulfonic acid, anhydrous hydrochloric acid, and the like.

The most typical spiro dihydric phenol for forming polycarbonates is 6,6'-dihydroxy-3,3,3',3'-tetramethyl-1,1'-spirobiindane ("SBI"), in which n in the above formula is 0 and the linkages with the rest of the polymer molecule are in a specific position on the aromatic rings.

The dihydric phenols (which are other than BPA and the comonomers in paragraph (ii) as set forth above) may be used alone or as mixtures of two or more dihydric phenols. Further illustrative examples of dihydric phenols include the dihydroxy-substituted aromatic hydrocarbons disclosed in U.S. Patent No. 4,217,438.

In addition, the present invention provides shaped, formed, or molded article comprising the polycarbonates of the first, second, third, fourth, and fifth aspects of the invention.

As noted above, the polycarbonates of the present invention may be prepared via the melt polymerization of dihydric phenol compounds and carbonic acid derivatives. In this regard, the carbonic acid derivatives will result in a repeat unit part structure which is merely a group of the formula

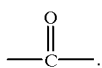

Accordingly, the polycarbonates of the invention would possess structural units comprised of the following formulas:

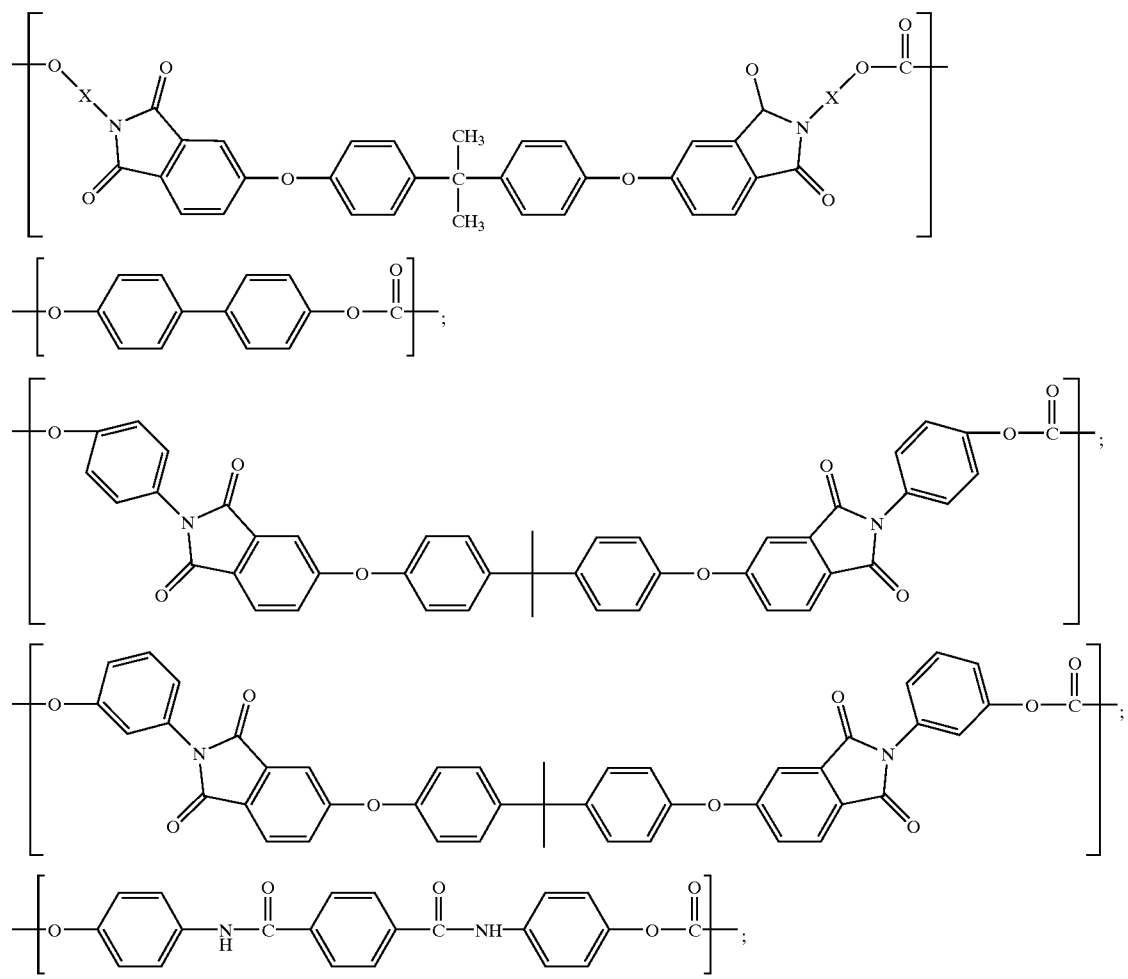

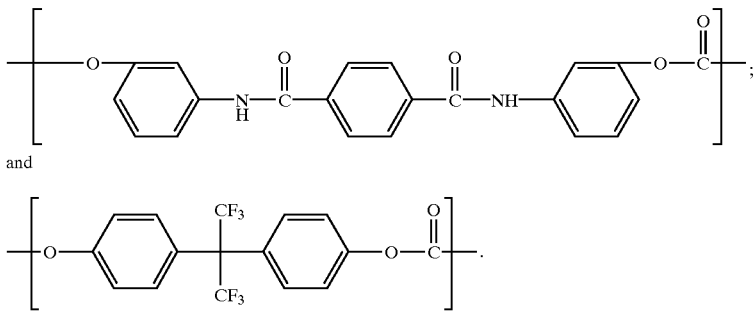

and

In the preparation of the polycarbonates of the present invention, especially typical diesters are the diesters of carbonic acid. As the diester of carbonic acid, various compounds may be used including, but not limited to, diaryl carbonate compounds, dialkyl carbonate compounds, and alkylaryl carbonate compounds. Typical diesters of carbonic acid include, but are not limited to, diphenyl carbonate; bis(4-t-butylphenyl)carbonate; bis(2,4-dichlorophenyl) carbonate; bis(2,4,6-trichlorophenyl)carbonate; bis(2-cyanophenyl)carbonate; bis(o-nitrophenyl)carbonate; ditolyl carbonate; m-cresol carbonate; dinaphthyl carbonate; bis(diphenyl)carbonate; diethylcarbonate; dimethyl carbonate; dibutyl carbonate; dicyclohexyl carbonate; and mixtures thereof. Of these, diphenyl carbonate is preferred. If two or more of these compounds are utilized, it is common that at least one is diphenyl carbonate.

Optionally, polyfunctional compounds may be utilized if the desired product is a branched polycarbonate. Such branched materials may be typical in certain applications, for example in films for packaging applications. Suitable polyfunctional compounds used in the polymerization of branched polycarbonate include, but are not limited to, 1,1,1-tris(4-hydroxyphenyl)ethane; 4-[4-[1,1-bis(4-hydroxyphenyl)-ethyl]-dimethylbenzyl]; trimellitic anhydride; trimellitic acid, or its acid chloride derivatives; trimethylolpropane; glycerol; and the like.

In the polycarbonates of the present invention, an end capping agent may optionally be used. Suitable end capping agents include monovalent aromatic hydroxy compounds, haloformate derivatives of monovalent aromatic hydroxy compounds, monovalent carboxylic acids, halide derivatives of monovalent carboxylic acids, and mixtures thereof.

Suitable end capping agents include, but are not limited to, phenol; p-tert-butylphenol; p-cumylphenol; p-cumylphenol carbonate; undecanoic acid; lauric acid; stearic acid; phenyl chloroformate; t-butyl phenyl chloroformate; p-cumyl chloroformate; chroman chloroformate; octyl phenyl; nonyl phenyl chloroformate; or a mixture thereof.

If present, the end capping agent is present in amounts in a range between about 0.01 moles and about 0.20 moles, typically in a range between about 0.02 moles and about 0.15 moles, even more typically in a range between about 0.02 and about 0.10 moles per 1 mole of the dihydric phenol.

In the practice of the present invention, a substantially equal molar mixture of the diester and the dihydric phenol compound is heated at atmospheric pressure in a substantially inert atmosphere at temperatures in a range between about 150° C. and about 210° C. Agitation of the mixture can be initiated as soon as the components start to melt. The system can be agitated slowly to promote better heat exchange. An effective amount of catalyst can be added at the outset of the reaction or after thermal equilibration, typically at the outset. An effective amount is in a range between about $1\times10^{-2}$ parts by weight and about $1\times10^{-6}$ parts by weight of the catalyst, per 100 parts by weight of the polycondensation mixture.

The resulting solution can be stirred until the catalyst has been dispersed and the reaction temperature of the mixture can be raised in a range between about 180° C. and about 210° C. while the pressure can be lowered to in a range between about 175 torr and about 250 torr. Distillation of aromatic hydroxy compound (i.e., the polycondensation by-product) can be effected and the pressure continuously reduced to further effect the separation of the aromatic hydroxy compound. The pressure of the reaction can be further reduced in a range between about 70 torr and about 130 torr while the temperature can be increased in a range between about 220° C. and about 250° C. The final stage of the reaction can be initiated by placing the condensation product under full vacuum at a pressure in a range between about 0.1 torr and about 5 torr and at a temperature in a range between about 270° C. and about 350° C. for in a range between about 0.5 hours and about 3 hours. Recovery of the final polycarbonate can be achieved after the theoretical amount of aromatic hydroxy compound has been collected.

The reaction conditions of the melt polymerization are not particularly limited and may be conducted in a wide range of operating conditions, hereinafter "polycarbonate melt polymerization conditions". The reaction temperature is typically in a range between about 100° C. and about 350° C., more typically in a range between about 180° C. and about 310° C. The pressure may be at atmospheric, or at an added pressure in a range between atmospheric and about 15 torr in the initial stages of the reaction, and at a reduced pressure at later stages, for example in a range between about 0.2 torr and about 15 torr. The reaction time is generally in a range between about 0.1 hours and about 10 hours.

The melt polymerization may be accomplished in one or more stages. The catalysts of the present invention may be added in the same stage or different stages, if the melt polymerization is conducted in more than one stage.

In one embodiment of the present invention, the process is conducted as a two stage process. In the first stage of this embodiment, the catalyst, e.g., sodium hydroxide (NaOH), is introduced into the reaction system comprising the dihydric phenol compound and the diaryloxy compound. The first stage is conducted at a temperature of 270° C. or lower, typically in a range between about 80° C. and about 250° C., more typically in a range between about 100° C. and about 230° C. The duration of the first stage is preferably in a range between 0 hours and about 5 hours, even more preferably in a range between 0 hours and about 3 hours at a pressure in a range between atmospheric pressure and about 100 torr, with a nitrogen atmosphere preferred.

In the second stage, the catalyst is introduced into the product from the first stage and further polycondensation is conducted. The catalyst may be added in its entire amount in the second stage, or it may be added in batches in the second and subsequent stages so that the total amount is within the aforementioned ranges.

It is typical in the second and subsequent stages of the polycondensation step for the reaction temperature to be raised while the reaction system is reduced in pressure compared to the first stage, thus bringing about a reaction between the dihydric phenol compound and the diaryloxy compound, and for the dihydric phenol and the diaryloxy compound finally to be subjected to a polycondensation reaction in a range between about 240° C. and about 320° C. under reduced pressure of 5 mm Hg or less, and typically 1 mm Hg or less.

If the melt polymerization is conducted in more than one stage, it is typical to add a base, such as tetramethylammonium hydroxide (TMAH) in an earlier stage than the catalyst of the present invention. In particular, it is typical to add the base to the reactor before the temperature reaches 220° C., typically before it reaches 200° C.

Additives may also be added to the polycarbonate product as long as they do not adversely affect the properties of the product. These additives include a wide range of substances that are conventionally added to the polycarbonates for a variety of purposes. Specific examples include heat stabilizers, epoxy compounds, ultraviolet absorbers, mold release agents, colorants, antistatic agents, slipping agents, anti-blocking agents, lubricants, antifogging agents, natural oils, synthetic oils, waxes, organic fillers, flame retardants, inorganic fillers and any other commonly known class of additives.

The reaction can be conducted as a batch, a semi-continuous, or a continuous process. Any desired apparatus can be used for the reaction. The material and the structure of the reactor used in the present invention is not particularly limited as long as the reactor has an ordinary capability of stirring. It is preferable that the reactor is capable of stirring in high viscosity conditions as the viscosity of the reaction system is increased in later stages of the reaction.

As noted above, certain comonomers of the invention impart improved hydrolytic stability to BPA-based polycarbonates. Thus, in a further aspect of the present invention, there is provided the use of the polycarbonates as set forth herein to produce shaped, formed or molded articles which are resistant to hydrolytic degradation. In a further embodiment of the present invention, there is provided the use of BUPT as a comonomer in BPA-based polycarbonates, as set forth herein, and the use of such polycarbonates as set forth herein to produce shaped, formed, or molded articles which are resistant to organic solvents.

In order that those skilled in the art will be better able to practice the present invention, the following examples are given by way of illustration and not by way of limitation.

EXPERIMENTAL SECTION

EXAMPLE 1

Improved Synthesis of bis-(4-hydroxyphenyl) terephthalamide. (BHPT)

To a solution of 4-aminophenol (54.56 grams, 500 millimoles) in 1-methyl-2-pyrrolidinone (250 milliliters) was added a solution of terephthaloyl chloride (40.62 grams, 200 millimoles) in the same solvent (100 milliliters) over 20 minutes. The mixture was stirred at room temperature for 30 minutes. The solvent was removed under reduced pressure and the oily residue was poured into methanol (500 milliliters), upon which the product crystallized. The suspension was filtered, the filtrate washed with methanol and purified by precipitating it from 1-methyl-2-pyrrolidinone into methanol. The excess 4-aminophenol and its hydrochloride can be recycled after removal of methanol under reduced pressure.

EXAMPLE 2

Copolymer Synthesis

To a melt polymerization reactor were added Bisphenol A (269.69 grams, 1.181 moles) BHPT (41.36 grams, 0.1187 moles) and diphenyl carbonate (289.763 grams, 1.353 moles). A solution of sodium hydroxide was added (catalyst, 620 milliliters of a 0.001 molar aqueous solution), the reactor was evacuated and equilibrated three times with nitrogen and the mixture was polymerized according to the program below. The resulting polymer was discharged as melt onto a Teflon®-coated aluminum foil, in the form of irregular strands.

Such copolymer materials, containing 15 weight percent of BHPT were insoluble in common organic solvents. The polymerization profile can be seen in Table 1.

TABLE 1

| Temperature (° C.) | Pressure (m bar) | Time (minutes) | Notes |
|---|---|---|---|
| 180 | 1000 | 30 | Reagents melting |
| 240 | 500 | 75 | |
| 260 | 500 | 15 | |
| 260 | 500–50 | 45 | Gradual vacuum increase |
| 280 | 50 | 30 | |
| 280 | 50–5 | 60 | Gradual vacuum increase, occassional foaming |
| 280 | 3 | 15 | |

Examples: Polymers having Improved Hydrolytic Stability

Melt Synthesis:

Reactions were conducted in a bench top system utilizing a small cylindrical reactor holding approximately 25 grams of reactants. The reactor was immersed in a salt bath heated by an electric heating mantle regulated by a temperature controller.

A distilling side arm consisted of a small Vigreux column and a receiving vial. A helical glass ribbon attached to a glass rod was used for stirring. A nitrogen and vacuum lines were connected to the reactor with the necessary valves.

A low molecular weight PC oligomer prepared by melt synthesis was used for BPA PC fraction (Mw=6000; Mn=~2400). When adding other comonomers, a molar excess of 4% of DPC was used (1.04 mole DPC per mole comonomer). NaOH was used as catalyst at a concentration of $7.5 \times 10^{-7}$ mole per mole comonomer. No additional NaOH was used for the PC oligomer fraction. Tetra methyl ammonium hydroxide was used as second catalyst at a concentration of $2.5 \times 10^{-4}$ mole per mole total monomer (BPA plus comonomers). All ingredients were added at the start of the reaction. The total reactants weight was about 20 grams.

The reaction temperature/pressure profile used is shown below in Table 2. At reaction, the polymerized material was collected from the reactor using ally, only 50% (about 10 g) was recovered.

TABLE 2

| Reaction Time (minutes) | Temperature (° C.) | Pressure (Torr) | Stirring Speed (rpm) |
|---|---|---|---|
| 0 | 230 | 760 | No stirring |
| 15 | 230 | 760 | 30 |
| 45 | 230 | 760 | 30 |
| 45 | 230 | 150 | 30 |
| 75 | 230 | 150 | 30 |
| 90 | 270 | 150 | 30 |
| 90 | 270 | 20 | 30 |
| 105 | 270 | 20 | 30 |
| 105 | 270 | 1.5 | 30 |
| 120 | 270 | 1.5 | 30 |
| 135 | 300 | 1.5 | 30 |
| 135 | 300 | 0 | 30 |
| 225 | 300 | 0 | 30 |

Gel permeation chromatography in chloroform was used to measure molecular weights (Mw). Calibration was performed using narrow polystyrene ranging from $10^2$ to $10^6$ Mw. Universal calibration used the following Mark-Houwink constraints:
PS: $K=1.70 \times 10^{-4}$ g/dL alpha=0.725
PC: $K2.29 \times 10^{-4}$ g/dL alpha=0.788

Film Molding

The polycarbonate films were pressed in a SPECAC IR film mold on a Carver press. The films were pressed in between aluminum foils to prevent contamination (no release agent used). Film thickness was usually 25 microns, diameter was 3 cm.

PC melt copolymer chunks recovered from the reactor were first cut in approximately 50 milligram pieces and dried overnight at 120° C. in vacuo.

The press (with the mold inserted between the platens) was preheated at 250° C.

Approximately 125 mg were weighed for one film. The material was allowed to melt in the mold inserted in the press for 2 minutes without pressure. This was followed by compression molding for 1.5 minutes at 5 tons pressure. The mold still containing the film was cooled in the special cooling device provided with the SPECAC mold. Removal of the aluminum foils was easier when the films were first allowed to stand at room temperature overnight.

Weight Loss Test

A 1.8 wt% caustic solution was prepared by dissolving NaOH pellets in demineralized water. Each film was individually immersed in this solution (without buckling or rolling) in small glass containers fitted with a tight plastic lid. The samples were placed in a convection oven regulating at 60° C. Temperatures were controlled by inserting a thermocouple in the oven between the containers. Typically, temperature stability was +/-1° C. (1 std. Deviation) at any given location.

The degradation conditions were chosen to mimic the industrial cleaning procedure of water bottles. Under this test, degradation occurred purely at the surface and could be seen as a surface erosion. The bulk of the material was unaffected as demonstrated by Mw measurements.

Weight loss was measured at regular intervals, 24 hours apart initially, later 48 or 72 hours until surface erosion led to holes in the films. Beyond that point, the assumption of a linear weight loss with respect to time could no longer be made and the experiment was stopped. After exposure for a given time, degraded PC-films were rinsed with demineralized water and isopropanol and allowed to dry in air.

Weight loss was measured by comparison with the original weight on an electronic balance. The balance was recalibrated before each weighing session and a control film was weighed before the actual samples were. Reproducibility of weighing was better than 0.1 mg (1 std. Deviation).

Comparative Examples

Two commercial grades of bisphenol A polycarbonate differing only by their molecular weight (unpigmented LEXAN 141 and 131) were tested for hydrolytic stability. Weight loss was been measured as indicated above at regular intervals in a range between 8 and 78 hours on 4 or 5 films of each type. Weight loss as function of time was satisfactorily linear. Therefore, the average weight loss rate for a particular film could be obtained.

The molecular weights of the samples are reported in Table 3. The average weight loss rate data for each polymer grade are reported in Table 4. Two series of experiments have been performed.

TABLE 3

| Sample | Mw | Mn | Mw/Mn |
|---|---|---|---|
| Lexan 141 | 47400 | 15300 | 3.10 |
| Lexan 131 | 68500 | 22100 | 3.10 |

TABLE 4

| Sample | Average weight loss rate (micro gr per hour) | Standard deviation of weight loss rate (micro gr per hour) |
|---|---|---|
| Lexan 141 (first series) | 127 | 9.3 |
| Lexan 141 (second series) | 155 | 12.0 |
| Lexan 131 (second series) | 163.5 | 20.3 |

A statistical test showed there was no significant difference between hydrolytic stability of the two grades indicating that molecular weight was not a significant influence for this test.

Further Examples of the Invention
Comonomers used

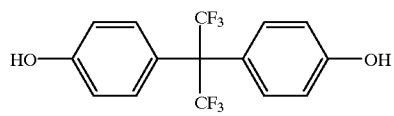

Hexafluoro Bisphenol A (BPAF)

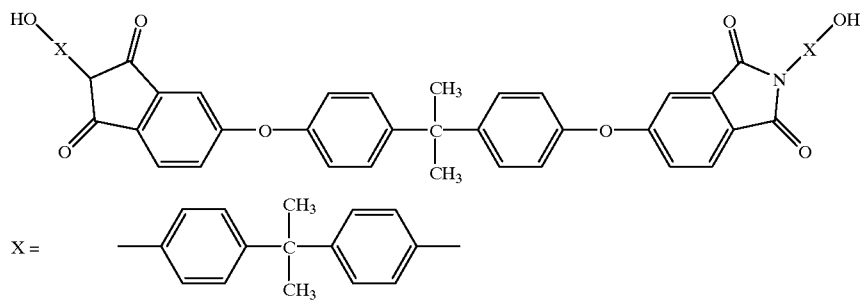

Bisimide bisphenol A (BIABPA)

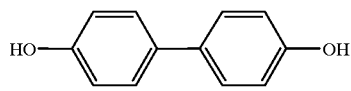

Biphenol (BIPH)

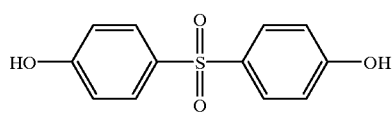

Bisphenol sulfone (BPSO)

Mixture design

Influence of a broad range of copolymer compositions has been assessed from analysis of a so-called "mixture" statistical design of experiments.

To build a mixture design, the boundaries for comonomer fractions in the copolymer must first be set. General guidelines for mixture designs recommend to broaden as much as possible the brackets for ingredients concentrations in order to reduce the problems associated with multi-collinearity of the variables. Therefore a weight percent in a range between about 15 and about 40 was chosen for the sum of repeating units for comonomers other than BPA. The balance was represented by bisphenol-A carbonate units. Obviously, the sum of all repeating units present in the copolymer must amount to 100%. It was not possible to polymerize a copolymer with 40 weight % BPSO above 15000 Mw (weight average Mw from universal calibration), too low for mechanical integrity of the films. Therefore, the constraint on BPSO was modified to 20 weight % maximum. Table 5 summarizes the ranges studied for copolymer composition. All copolymer compositions are expressed as weight percentages of repeating units.

Based on the number of ingredients (five in total) and the applied constraints, the software generated a design containing 12 unique compositions and 3 repeats. The original design included a copolymer composition containing 40 weight percent BPSO which was left out of the analysis because MW could not be built high enough. Table 6 presents the composition ranges for copolymers (sum of all units is always 100%).

TABLE 5

| Comonomer | Units | | | Range | | |
|---|---|---|---|---|---|---|
| BIABPA | (weight %) | 0 | ≦ | BIABPA | ≦ | 40 |
| BIPH | (weight %) | 0 | ≦ | BIPH | ≦ | 40 |
| BPAF | (weight %) | 0 | ≦ | BPAF | ≦ | 40 |
| BPSO | (weight %) | 0 | ≦ | BPSO | ≦ | 20 |
| BPA | (weight %) | 60 | ≦ | BPA | ≦ | 85 |

TABLE 6

| Sample No. | BIABPA (%) | BIPH (%) | BPAF (%) | BPSO (%) | BPA (%) |
|---|---|---|---|---|---|
| 2 | 0.00 | 0.00 | 40.00 | 0.00 | 60.00 |
| 3 | 6.88 | 6.88 | 6.88 | 6.88 | 72.50 |
| 4 | 0.00 | 27.50 | 0.00 | 0.00 | 72.50 |
| 6 | 0.00 | 0.00 | 15.00 | 0.00 | 85.00 |
| 7 | 0.00 | 40.00 | 0.00 | 0.00 | 60.00 |
| 8 | 0.00 | 0.00 | 0.00 | 15.00 | 85.00 |
| 9 | 0.00 | 0.00 | 40.00 | 0.00 | 60.00 |
| 10 | 20.00 | 0.00 | 0.00 | 20.00 | 60.00 |
| 11 | 40.00 | 0.00 | 0.00 | 0.00 | 60.00 |
| 12 | 23.44 | 3.44 | 3.44 | 3.44 | 66.25 |
| 13 | 3.44 | 3.44 | 10.94 | 3.44 | 78.75 |
| 14 | 6.88 | 6.88 | 6.88 | 6.88 | 72.50 |
| 15 | 10.94 | 3.44 | 3.44 | 3.44 | 78.75 |
| 16 | 10.94 | 3.44 | 3.44 | 3.44 | 78.75 |

The mixture design was generated and analyzed with help of a specialized software (CARD). A Scheffe model was chosen as the best suited for a pure mixture design. Scheffe models contain no independent term nor square terms (because these terms can be expressed as linear combinations of the other terms; this is a consequence of the "sum of ingredients is 100%" rule).

$$Y = \Sigma A_i X_i + \Sigma_{(n \neq m)} B_{nm} X_n X_m$$

Y=hydrolysis rate in micrograms per hour.
Xi=weight fraction of component i

All compositions were polymerized according to the procedure described above. Four films were molded for each composition, each film was measured two or three times (after approx. 40 hours, 120 hours and 200 hours in the caustic solution). Results for hydrolysis rate are presented in Table 7.

TABLE 7

| Sample No. | Average Weight loss rate (micrograms per hour) | Standard deviation of weight loss rate (micrograms per hour) |
|---|---|---|
| 2 | 37,20 | 4,40 |
| 3 | 26,15 | 1,30 |
| 4 | 42,62 | 2,81 |
| 6 | 47,91 | 9,28 |
| 7 | 150,9 | 8,88 |
| 8 | 57,66 | 3,36 |
| 9 | 35,86 | 2,25 |
| 10 | 34,91 | 2,30 |
| 11 | 12,97 | 1,65 |
| 12 | 21,78 | 1,08 |
| 13 | 34,59 | 2,07 |
| 14 | 40,84 | 2,35 |
| 15 | 22,19 | 1,80 |
| 16 | 30,74 | 1,35 |

Table 8 summarizes the Molecular Weight results obtained by gel permeation chromatography. These results demonstrate we were able to obtain high MW polymer for all the compositions in the studied range. The composition ranges for the copolymer can be seen in Table 6.

TABLE 8

| Sample No. | Universal Calibration | | | PS Standards | | |
|---|---|---|---|---|---|---|
| | Mw | Mn | Z | Mw | Mn | Z |
| 2 | 28700 | 9300 | 3.1 | 49700 | 21700 | 2.3 |
| 3 | 31200 | 9800 | 3.2 | 56000 | 17200 | 3.3 |
| 4 | 22900 | 10700 | 2.2 | 39400 | 19300 | 2.0 |
| 6 | 28700 | 12300 | 2.3 | 50000 | 17700 | 2.8 |
| 7 | 21900 | 10600 | 2.1 | 37700 | 18000 | 2.1 |
| 8 | 36600 | 8200 | 4.5 | 65200 | 11200 | 5.8 |
| 9 | 29100 | 7300 | 4.0 | 53500 | 12500 | 4.3 |
| 10 | 19700 | 6900 | 2.9 | 36000 | 10300 | 3.5 |
| 11 | 25900 | 11800 | 2.2 | 50300 | 21400 | 2.4 |
| 12 | 32900 | 11800 | 2.8 | 57500 | 24300 | 2.4 |
| 13 | 60500 | 11900 | 5.1 | 113400 | 2100 | 5.4 |
| 14 | 35700 | 10500 | 3.4 | 62100 | 20600 | 3.0 |
| 15 | 33100 | 12500 | 2.6 | 57000 | 20400 | 2.8 |
| 16 | 30500 | 12800 | 2.4 | 53800 | 25100 | 2.1 |

Hydrolytic testing was performed as described above. Average hydrolysis rate data (over 8 films) are reported in Table 5.

Statistical analysis was performed on the data of Table 5. The influence of copolymer composition variables on the hydrolysis rate can be expressed by the following equation:

$$Hydrolsis\ rate = 2.990 * [BIPH] - 0.475 * [BIABPA] + 0.120 * [BPAF] + 0.526 * [BPA] + 0.694 * [BPSO] - 368 * [BIPH/40] * [BPA/(85-60)] - 253 * [BIPH/40] * [BIABPA/40]$$

all composition variables expressed in weight percent

Hydrolysis rate expressed in micrograms per hour

Other linear or interaction terms were not significant. The fit of the model cellent as demonstrated by the high regression coefficient (r=0.988), high % of confidence for the model (100%, F=92.1) and low lack of fit (6% risk of lack of fit, F=0.6).

Analysis of the model terms for hydrolysis rate showed that BIABPA and BPAF had a favorable linear influence, while BIPH had an unfavorable linear influence but favorable interaction with BIABPA and BPA.

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A polycarbonate comprised of residues of;
   (a) a diester compound; and
   (b) a dihydric phenol compound, wherein said dihydric phenol compound(s) are comprised of
      (i) 2,2-bis(4-hydroxyphenyl) propane; and
      (ii) at least one comonomer in a range between about 1 weight percent and about 50 weight percent of the repeating units in the polycarbonate, comprising bis-(4-hydroxyphenyl)-terephthalamide, bis-(3-hydroxyphenyl)terephthalamide, a compound of the formula

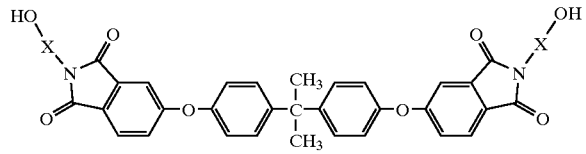

wherein X is a divalent aromatic moiety; and
      (iii) optionally, dihydric phenol compounds in addition to those in (i) and (ii).

2. The polycarbonate of claim 1, wherein X comprises phenylene, naphthalene, or groups of the formula

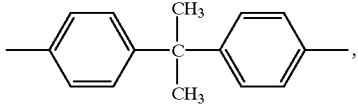

optionally substituted by one or more groups selected from $C_1$–$C_8$ alkyl, $C_1$–$C_8$ alkoxy, halo, and nitro.

3. The polycarbonate of claim 1, further comprising at least one comonomer comprising 4,4'-biphenol or a compound of the formula

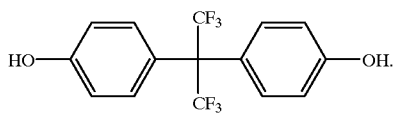

4. The polycarbonate of claim 3, wherein the 4,4'-biphenol is in a range between about 1 weight percent and about 30 weight percent of the repeating units in the polycarbonate.

5. The polycarbonate of claim 3, wherein the compound of the formula

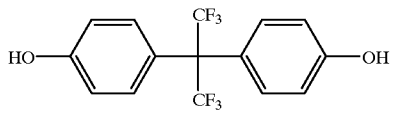

is in a range between about 1 weight percent and about 15 weight percent of the repeating units in the polycarbonate.

6. The polycarbonate of claim 3, wherein the 4,4'-biphenol is in a range between about 1 weight percent and about 15 weight percent of the repeating units in the polycarbonate, and the compound of the formula

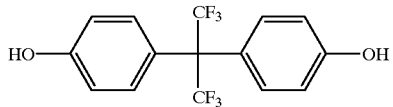

is in a range between about 1 weight percent and about 15 weight percent of the repeating units in the polycarbonate.

7. The polycarbonate of claim 1, wherein the diester compound is selected from the group consisting of diphenyl carbonate; bis(4-t-butylphenyl)carbonate; bis(2,4-dichlorophenyl)carbonate; bis(2,4,6-trichlorophenyl)carbonate; bis(2-cyanophenyl)carbonate; bis(o-nitrophenyl)carbonate; ditolyl carbonate; m-cresol carbonate; dinaphthyl carbonate; bis(diphenyl)carbonate; diethylcarbonate; dimethyl carbonate; dibutyl carbonate; dicyclohexyl carbonate; and mixtures thereof.

8. The polycarbonate of claim 1, wherein the diester compound is diphenyl carbonate.

9. A polycarbonate comprised of residues of;
   (a) a diester compound; and
   (b) a dihydric phenol compound, wherein said dihydric phenol compound(s) are comprised of
      (i) 2,2-bis(4-hydroxyphenyl) propane; and
      (ii) 4,4'-biphenol in a range between about 1 weight percent and about 30 weight percent of the repeating units in the polycarbonate.

10. The polycarbonate of claim 9, wherein the 4,4'-biphenol is in a range between about 1 weight percent and about 15 weight percent of the repeating units in the polycarbonate.

11. The polycarbonate of claim 9, wherein the diester compound is a diaryl carbonate compound.

12. The polycarbonate of claim 9, wherein the diester compound is selected from the group consisting of diphenyl carbonate; bis(4-t-butylphenyl)carbonate; bis(2,4-dichlorophenyl)carbonate; bis(2,4,6-trichlorophenyl)carbonate; bis(2-cyanophenyl)carbonate; bis(o-nitrophenyl)carbonate; ditolyl carbonate; m-cresol carbonate; dinaphthyl carbonate; bis(diphenyl)carbonate; diethylcarbonate; dimethyl carbonate; dibutyl carbonate; dicyclohexyl carbonate; and mixtures thereof.

13. The polycarbonate of claim 9, wherein the diester compound is diphenyl carbonate.

14. A polycarbonate comprised of residues of;
   (a) a diester compound; and
   (b) a dihydric phenol compound, wherein said dihydric phenol compound(s) are comprised of
      (i) 2,2-bis(4-hydroxyphenyl) propane; and
      (ii) comonomers in a range between about 1 weight percent and about 30 weight percent of the repeating units in the polycarbonate, comprising 4,4'-biphenol or a compound of the formula

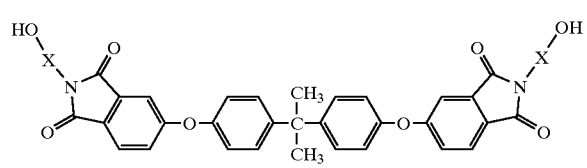

wherein X is a group of the formula

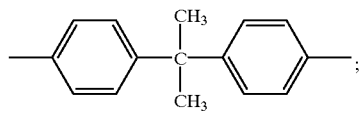

wherein the 4,4'-biphenol is in a range between about 1 weight percent and about 15 weight percent of the repeating units in the polycarbonate.

15. The polycarbonate of claim 14, wherein the diester compound is a diester of carbonic acid.

16. The polycarbonate of claim 14, wherein the diester compound is a diaryl carbonate compound.

17. The polycarbonate of claim 14, wherein the diester compound is selected from the group consisting of diphenyl carbonate; bis(4-t-butylphenyl)carbonate; bis(2,4-dichlorophenyl)carbonate; bis(2,4,6-trichlorophenyl)carbonate; bis(2-cyanophenyl)carbonate; bis(o-nitrophenyl)carbonate; ditolyl carbonate; m-cresol carbonate; dinaphthyl carbonate; bis(diphenyl)carbonate; diethylcarbonate; dimethyl carbonate; dibutyl carbonate; dicyclohexyl carbonate; and mixtures thereof.

18. The polycarbonate of claim 14, wherein the diester compound is diphenyl carbonate.

19. A polycarbonate comprised of residues of;
   (a) a diester compound; and
   (b) a dihydric phenol compound, wherein said dihydric phenol compound(s) are comprised of
      (i) 2,2-bis(4-hydroxyphenyl) propane; and
      (ii) a comonomer in a range between about 1 weight percent and about 50 weight percent of the repeating units in the polycarbonate, of the formula

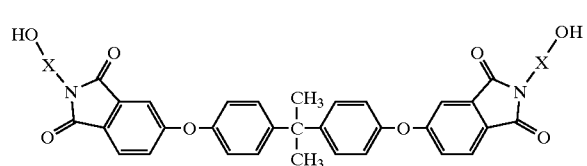

wherein X is a group of the formula

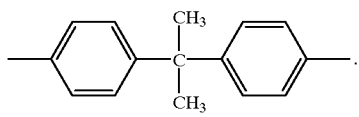

20. The polycarbonate of claim 19, wherein the comonomer is utilized in a range between about 1 weight percent and about 15 weight percent of the repeating units in the polycarbonate.
21. The polycarbonate of claim 19, wherein the diester compound is a diaryl carbonate compound.
22. The polycarbonate of claim 19, wherein the diester compound is selected from the group consisting of diphenyl carbonate; bis(4-t-butylphenyl)carbonate; bis(2,4-dichlorophenyl)carbonate; bis(2,4,6-trichlorophenyl)carbonate; bis(2-cyanophenyl)carbonate; bis(o-nitrophenyl)carbonate; ditolyl carbonate; m-cresol carbonate; dinaphthyl carbonate; bis(diphenyl)carbonate; diethylcarbonate; dimethyl carbonate; dibutyl carbonate; dicyclohexyl carbonate; and mixtures thereof.
23. The polycarbonate of claim 19, wherein the diester compound is diphenyl carbonate.
24. A polycarbonate comprised of residues of;
    (a) a diester compound; and
    (b) a dihydric phenol compound, wherein said dihydric phenol compound(s) are comprised of
        (i) 2,2-bis(4-hydroxyphenyl) propane; and
        (ii) bis-(4-hydroxyphenyl)terephthalimide in a range between about 1 weight percent and about 50 weight percent of the repeating units in the polycarbonate.
25. The polycarbonate of claim 24, wherein the bis-(4-hydroxyphenyl)-terephthalimide is utilized in an amount in range between about 1 weight percent and about 15 weight percent of the repeating units in the polycarbonate.
26. The polycarbonate of claim 24, wherein the diester compound is a diaryl carbonate compound.
27. The polycarbonate of claim 24, wherein the diester compound is selected from the group consisting of diphenyl carbonate; bis(4t-butylphenyl)carbonate; bis(2,4-dichlorophenyl)carbonate; bis(2,4,6-trichlorophenyl)carbonate; bis(2-cyanophenyl)carbonate; bis(o-nitrophenyl)carbonate; ditolyl carbonate; m-cresol carbonate; dinaphthyl carbonate; bis(diphenyl)carbonate; diethylcarbonate; dimethyl carbonate; dibutyl carbonate; dicyclohexyl carbonate; and mixtures thereof.
28. The polycarbonate of claim 24, wherein the diester compound is diphenyl carbonate.
29. A shaped, formed, or molded article comprised of the polycarbonate of claim 1.
30. A shaped, formed, or molded article comprised of the polycarbonate of claim 9.
31. A shaped, formed, or molded article comprised of the polycarbonate of claim 14.
32. A shaped, formed, or molded article comprised of the polycarbonate of claim 19.
33. A shaped, formed, or molded article comprised of the polycarbonate of claim 24.

* * * * *